United States Patent [19]

Benson

[11] Patent Number: 5,507,595
[45] Date of Patent: Apr. 16, 1996

[54] APPARATUS FOR TREATING SOIL

[76] Inventor: William M. Benson, 3537 Pebble Beach Dr., Martinez, Ga. 30907

[21] Appl. No.: 429,930

[22] Filed: Apr. 27, 1995

[51] Int. Cl.[6] .............................. A01G 9/24; E02B 11/00
[52] U.S. Cl. .............................. 405/43; 47/1.01; 405/45; 405/36; 405/269
[58] Field of Search .................... 405/43, 36, 45, 405/51, 37, 269; 47/1.01, 1 F

[56] References Cited

U.S. PATENT DOCUMENTS

| | | | |
|---|---|---|---|
| 1,173,534 | 2/1916 | Ryan . | |
| 1,864,198 | 6/1932 | Johnson . | |
| 1,998,856 | 4/1935 | Towt . | |
| 3,470,943 | 10/1969 | Van Huisen | 165/45 |
| 3,521,699 | 7/1970 | Van Huisen | 165/1 |
| 3,944,139 | 3/1976 | Butler | 239/77 |
| 4,293,237 | 10/1981 | Robey et al. | 405/39 |
| 4,437,263 | 3/1984 | Nir et al. | 47/1.01 |
| 4,955,585 | 9/1990 | Dickerson | 261/26 |
| 5,120,158 | 6/1992 | Husu | 405/43 |
| 5,125,797 | 6/1992 | Kapich | 415/202 |
| 5,163,781 | 11/1992 | Husu | 405/43 |
| 5,219,243 | 6/1993 | McCoy | 405/43 |
| 5,282,873 | 2/1994 | Watari | 47/1.01 |
| 5,322,387 | 6/1994 | Heine et al. | 405/43 X |

FOREIGN PATENT DOCUMENTS

| | | |
|---|---|---|
| 2738133 | 3/1979 | Germany . |
| 292359 | 8/1991 | Germany . |
| 2184333 | 6/1987 | United Kingdom . |

Primary Examiner—Stephen J. Novosad
Attorney, Agent, or Firm—Harris Beach & Wilcox

[57] ABSTRACT

Apparatus for treating the soil of a grass playing field that includes a piping system containing perforated pipe lines seated in a distribution bed beneath the soil of the playing field. A blower having a discharge port and a suction port is selectively connected to the duct networks to either pump air upwardly or draw air downwardly through the soil profile. A separator is connected in the air supply line of the system for removing water from the air stream moving between the blower and the duct network. The removed water is collected in a holding tank for recycling, or disposed of in an environmentally safe manner.

21 Claims, 4 Drawing Sheets

APPARATUS FOR TREATING SOIL

BACKGROUND OF THE INVENTION

This invention relates to apparatus for treating a grass playing field and, in particular, to apparatus for treating the turf of a grass playing field by selectively moving air in either direction through the soil profile of the playing field.

The term turf, as herein used, refers to the upper layer of earth which typically supports vegetation which, in this case, is preferably grass. The term subsoil or subsoil profile as herein used, refers to one or more prepared layers situated beneath the playing field that are designed to promote the health of the grass turf. The subsoil profile may contain one or more soil layers situated immediately below the turf that are prepared from mostly natural organic matter or mixtures thereof designed to feed or otherwise sustain the grass rootstock. Below the soil layers may be a choker layer which is predominantly sand and finally a gravel bed capable of distributing air.

Many grasses, and in particular, those used on golf course greens, are temperature sensitive and thus tend to become dormant or die off when exposed to either high or low ambient temperatures. Many golf course greens in southern climates contain bent grasses that are native to more northern climates. These grasses, unless somehow protected, die off in the summer, thus making play difficult during a time when it is most desirable to use the course. Heretofore, large fans have been used with some success to move cooling air across the surface of the green during periods of high temperatures. Overwatering and syringing of the greens has also been employed with success to cool the grass of a putting green. However, these methods have proven to be expensive, time consuming and adversely effect play on the course. Little has been done, on the other hand, to protect the sensitive golf course grasses during cold spells.

As explained in greater detail in co-pending U.S. application Ser. No. 08/177,441 filed Jan. 5, 1994, now U.S. Pat. No. 5,433,759, an underground system has been devised for both heating and cooling grass on a golf course green using the available air and ground as sources of energy. Either the suction side or the discharge side of a blower is selectively attached to a perforated piping system laid in a gravel bed beneath the soil of the green. Depending on the relative air and ground temperatures, air is either pushed upwardly or pulled downwardly through the soil profile to achieve the desired cooling or heating of the turf. It is important, however, to limit the amount of moisture that is carried by the air stream as it passes through the system for a number of reasons. When the blower is operating in a suction mode, excessive water found in the subsoil profile can be pulled into the rotating stages of the machine where it can produce excessive wear and corrosion of the rotor, the machine, and stator parts. If the green has been treated with fertilizer or other chemicals, the corrosion process is greatly accelerated, thus leading to early machine failure. In the event the humidity content of air drawn in the blower during the pumping mode is high, the air flow passing upwardly through the soil profile will leave behind a good deal of water. This, in turn, can adversely effect moisture content in the subsoil profile of the playing field.

SUMMARY OF THE INVENTION

It is a primary object of the present invention to improve apparatus for heating and cooling a grass playing field.

It is a further object of the present invention to protect the component parts of a blower that is adapted to move air in either direction through the soil profile of a grass playing field.

It is a still further object of the present invention to prevent harmful chemicals from passing through a blower used to provide both cooling and heating air to the soil profile of a playing field.

Another object of the present invention is to maintain the water balance in the soil profile beneath a grass playing field that is being heated and cooled by a stream of air moving through the soil profile in either direction.

It is still another object of the present invention to provide an environmentally safe system for heating and cooling the turf of a grass playing field.

These and other objects of the invention are attained by an underground air handling system for heating and cooling the turf of a grass playing field that includes a perforated pipe network buried in a gravel bed beneath the playing field and a blower connected to the pipe network. Either the suction side or the discharge side of the blower is selectively coupled to the pipe network to draw air downwardly or alternatively pump air upwardly through the soil profile of the playing field to provide the desired heating or cooling of the turf. A separator is connected into the air handling system between the blower and the pipe network that is capable of removing moisture and moisture laden containment from the air stream.

In one embodiment of the invention, the moisture separated from the air stream is collected in a holding tank so that it can be reapplied to the playing field when needed or disposed of in an environmentally safe manner.

In another embodiment of the invention, the blower, a flow reversing mechanism, and the separator are mounted upon a mobile carrier that can be transported to a playing field equipped with the necessary underground pipe networks.

BRIEF DESCRIPTION OF THE DRAWINGS

For a better understanding of these and other objects of the present invention, reference will be made to the following detailed description of the invention which is to be read in association with the accompanying drawings, wherein.

DETAILED DESCRIPTION OF THE PREFERRED EMBODIMENT

Figure 1:
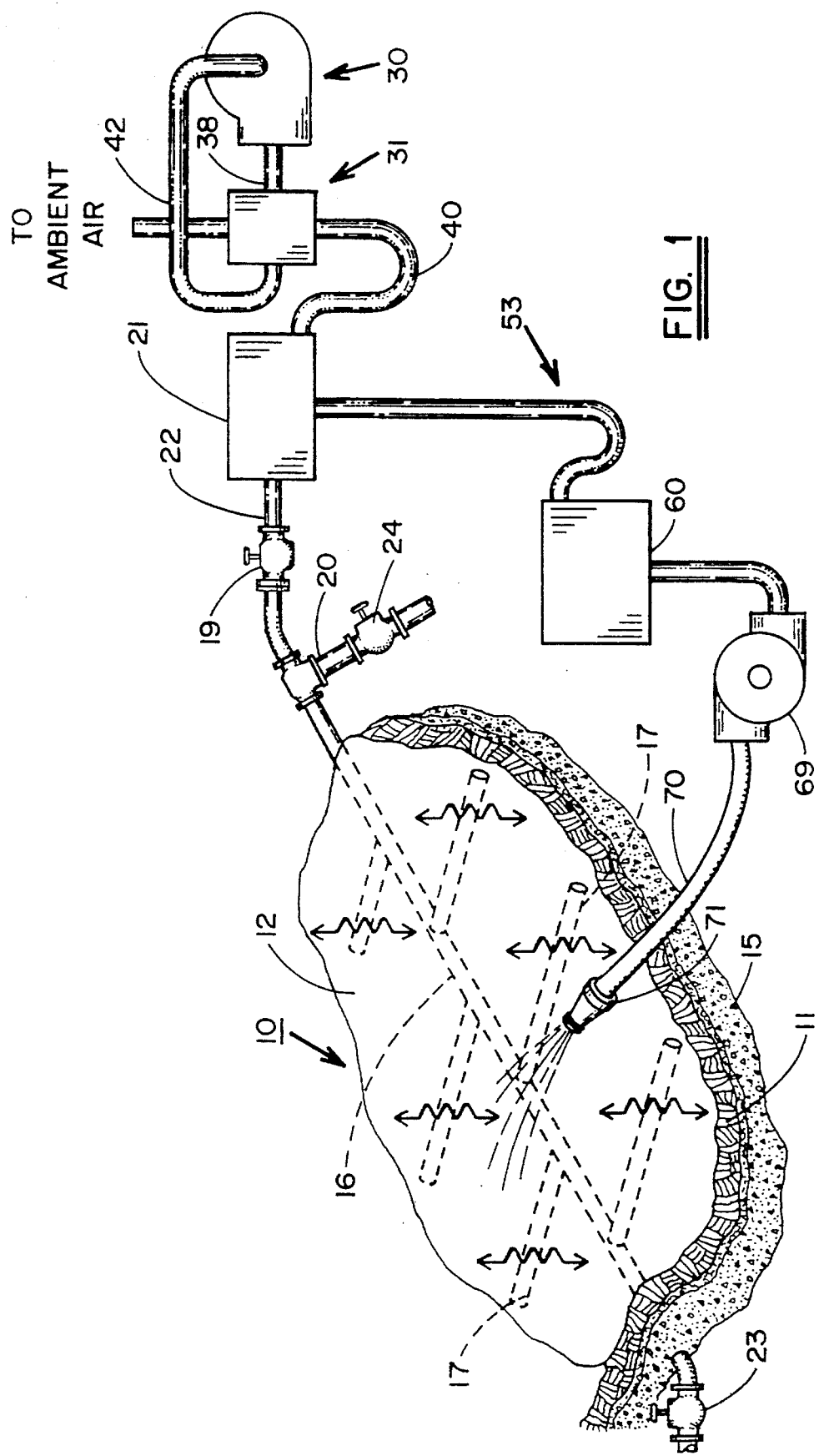
FIG. 1 is a plan view showing the apparatus of the present invention for selectively heating or cooling the turf of a grass playing field.

Turning now to FIG. 1 there is shown one form of the invention for treating a golf course green which is generally referenced 10. Although the present invention will be explained with specific reference to use in treating a golf course green, it should become evident from the disclosure below that the invention has wider applications and can be used in association with many different types of grass outdoor playing fields such as football fields or soccer fields.

The green depicted in FIG. 1 is constructed in compliance with specifications issued by the United States Golf Association (USGA). The green includes a top layer of soil that is about 12 inches deep for supporting a grass playing surface 12. Immediately below the soil layer is a layer of choker sand 13 that is about 2–4 inches deep. The choker layer is supported upon a gravel bed 15 that is at least 4 inches deep. The gravel bed contains particles of a size and shape such that interstices are formed between the particles thus allowing air to freely circulate throughout the bed beneath the soil profile of the green.

A duct network of perforated pipes is laid within the gravel bed and, as will be explained in greater detail below, is connected to a blower capable of moving air in both directions through the gravel bed at a volume and pressure such that air is either pumped upwardly or drawn downwardly through the soil profile. The network includes a main feeder line 16 which is coupled to a series of distribution lines 17—17 in a herringbone configuration that conforms to the general shape of the green. The pipes may have an inside diameter of between 4 to 6 inches and the lines are typically spaced about 10–15 feet apart to maintain thorough air distribution throughout the bed. The pipes in the duct network slopes downwardly towards a control valve 19 that can be cycled manually or automatically to selectively connect the duct network via line 20 to a drain system servicing the golf course or, alternatively, to a separator unit 21 via line 22. A check valve 24 is connected into the drain line below the three way valve. The opposite end of the duct network contains a service valve 23 that may be connected to a water supply to periodically flush the pipelines when required.

Figure 4:
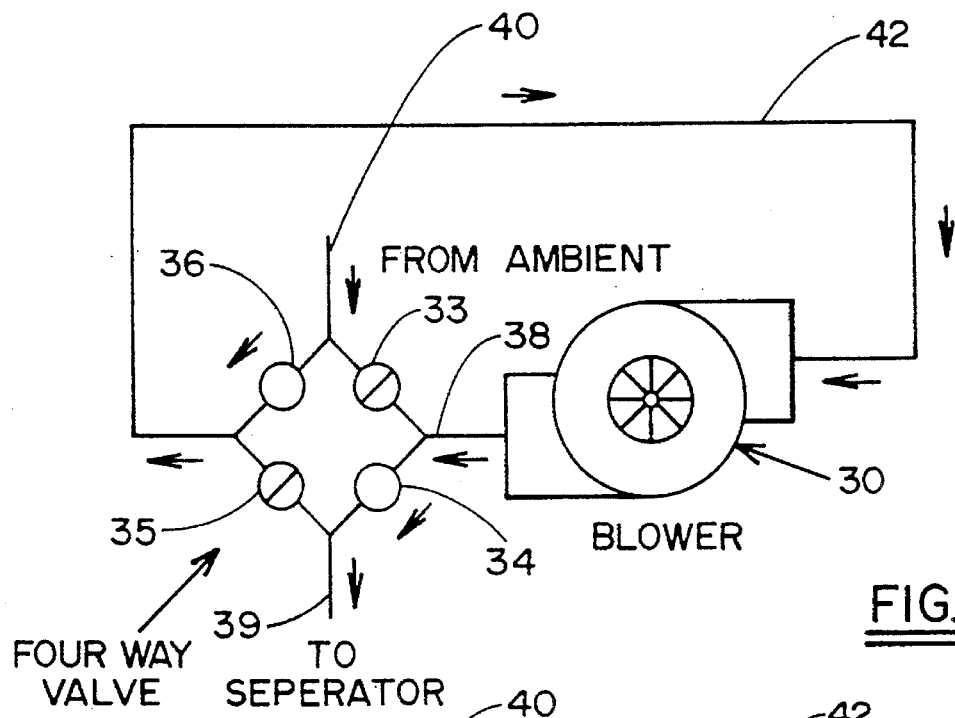
FIGS. 4 and 5 are schematic views showing the positioning of the flow reversing valves when the blower is either in a pumping mode and a suction mode of operation.
Figure 5:
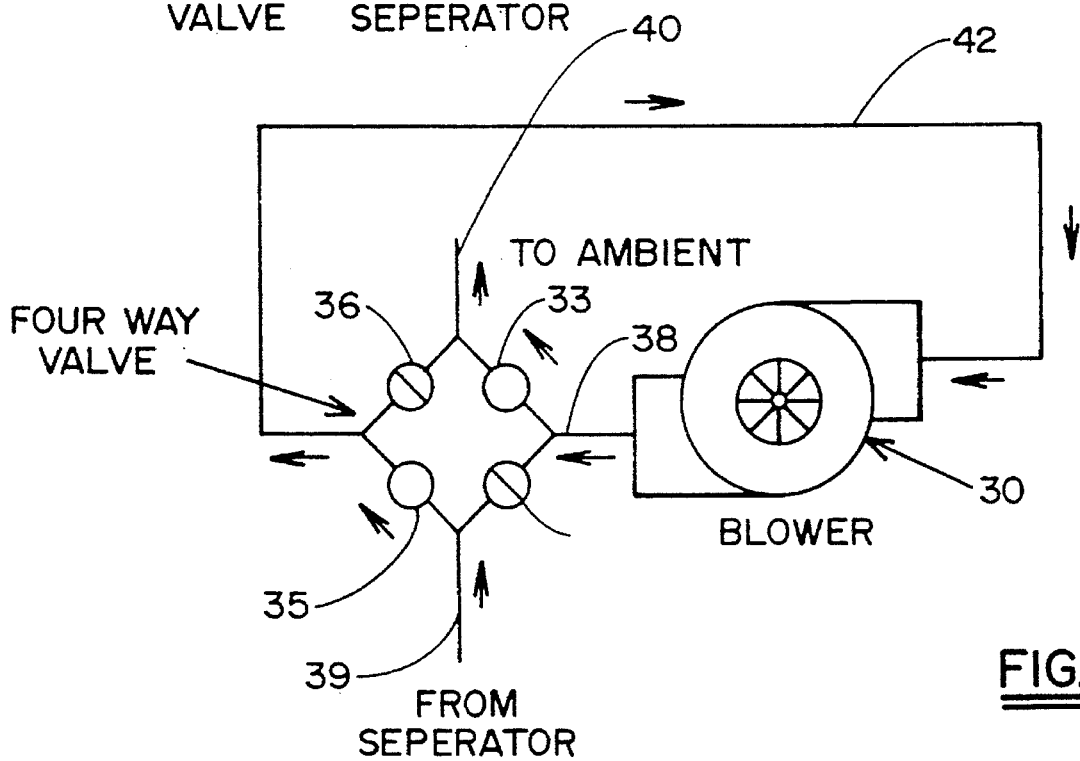

A blower 30 is connected to the separator unit by means of a four way flow reversing unit 31 that permits air to be either drawn out of or pushed into the pipe line network. With further reference to FIGS. 4 and 5 the flow reversing unit 31 contains four control valves 33–36 mounted in a bridge configuration. The entrance to the bridge is connected to the discharge side of the blower by a discharge line 38. A first adjacent pair of the bridge legs is connected to the separator by line 39 while a second adjacent pair of the bridge legs is connected to the surrounding ambient via a second air supply line 40. The exit to the bridge is attached to the suction side of the blower by means of a suction line 42.

FIG. 4 depicts the positioning of the flow reversing unit valves when air is being pumped into the duct network. A predetermined volume of air is delivered under pressure through the pipe line into the gravel bed so that the air is distributed uniformly throughout the bed and then driven upwardly to penetrate the entire soil profile. The flow of air through the soil is employed to either heat or cool the turf, depending on the prevailing ambient and ground conditions. The flow of air through the soil also provides an added benefit in that it serves to aerate the soil and thus promotes the health and growth of the grass turf. During the pumping operational mode, valves 33 and 35 are closed and valves 34 and 36 are opened.

To reverse the function of the blower the valves are cycled as shown in FIG. 5 to open valves 33 and 35 and close valves 34 and 36. Reversal of the valve positions functions to connect the suction side of the blower with pipe lines in the duct network. Sufficient suction is provided by the blower to draw ambient air downwardly through the soil profile into the gravel distribution bed to again provide the desired heating or cooling of the grass turf. A further benefit of the suction mode of operation is that it affords rapid removal of excess water from the soil profile during periods of heavy rain or flooding. Excess water in the soil is drawn quickly down into the gravel bed and collected in the pipe lines. As will be explained in greater detail below, the moisture laden air stream is drawn into the separator unit 21 where the moisture and any airborne particulates are removed from the air stream and delivered to a holding tank 60 without interrupting the blower operation. The present apparatus can, in addition, continuously collect and drain moisture when operating in the pumping or suction mode. Alternatively, the blower operation may be terminated for a short period of time during which valve 19 is cycled allowing any water collected in the duct lines to be gravity fed to the drain system.

Figure 2:
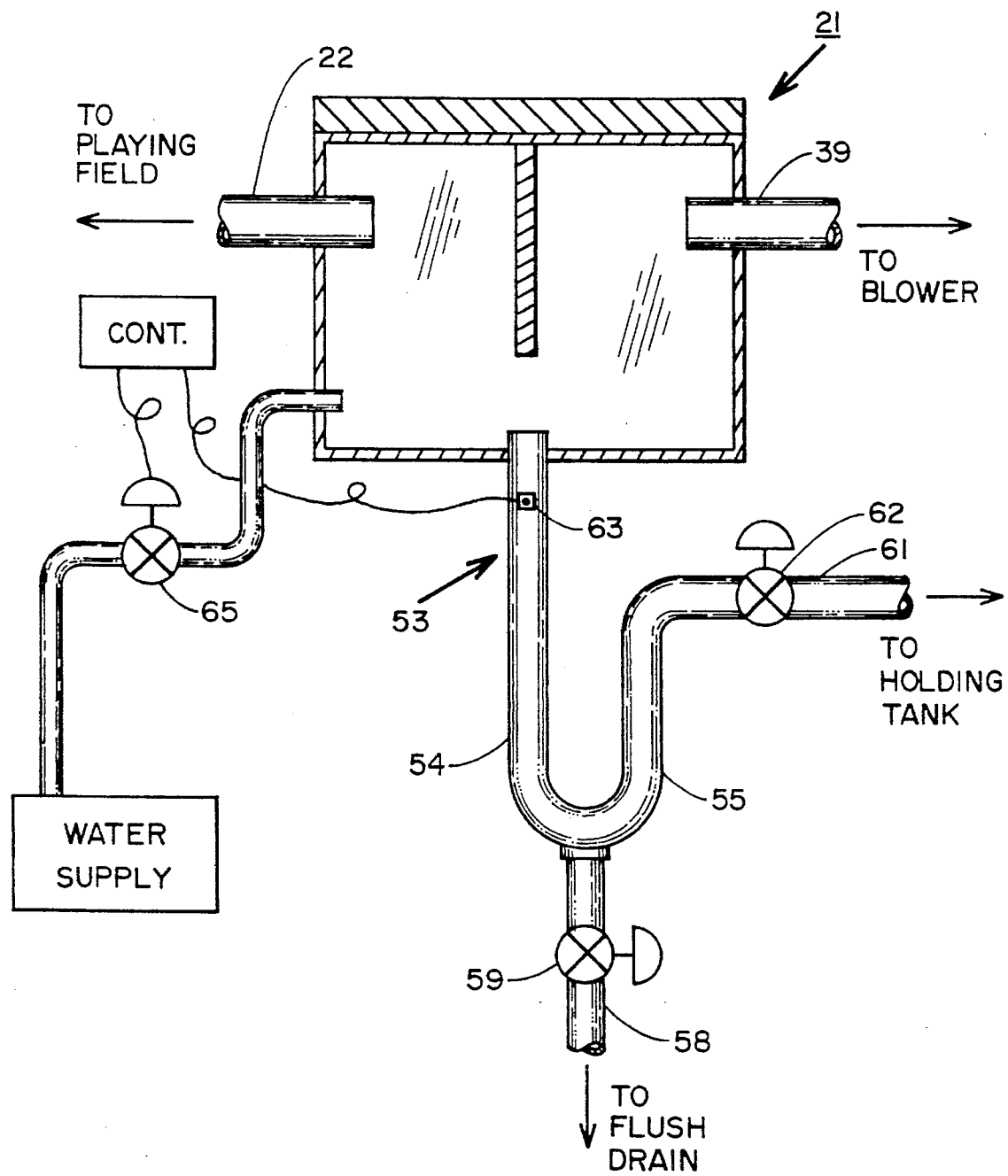
FIG. 2 is an enlarged side elevation showing a water separator and holding tank utilized in the apparatus of the present invention.

FIG. 2 illustrates schematically the construction of the separator unit 21 which includes a tank 45 that is connected to the reversing unit 31 via line 39. The tank is similarly connected to the control valve 19 via line 22. Normally when the blower is operating, the control valve 19 is cycled to place the separator unit in communication with the duct network beneath the playing field. A cover 46 is attached to the top of the tank and is closed against the tank using suitable fasteners. A seal 47 is mounted between the cover and the tank body to render the unit air tight. A baffle 49 is hung from the cover so that it is in the air stream moving through the separator. The baffle contains a filter 50 that is adapted to separate moisture and particulate materials contained in the air stream and deposit them at the bottom of the tank.

A drain line 51 is connected into the bottom wall 52 of the tank. A U-shaped trap 53 is connected into the drain line 51. The trap contains a first vertical leg 54 that collects water from the bottom of the separator tank and a second shorter vertical leg 55 that is connected to the first leg by a 90° bend 57. A flush line 58 is connected into the bend and contains a control valve 59 that can be cycled automatically or manually to flush the trap when the trap requires cleaning. The shorter leg of the trap is connected to a holding tank 60 (FIG. 1) via line 61. A second control valve 62 is connected into line 61 which again can be cycled manually or automatically to open and close the holding tank line.

The water head pressure contained in the trap 53 is greater than the pumping or suction pressure of the blower. Any water collected in the bottom of the separator tank can thus be continually passed through the trap without adversely effecting or interrupting the operation of the blower.

A water level sensor 63 is mounted in the leg 654 of the trap and is arranged to send a low water level signal to a controller 64 when the water in the trap is reduced to a predetermined level. Normally when the blower is operating in a suction mode, ground water or moisture is being collected in the separator tank and the trap will remain full. However, during times when the blower is in a pumping mode, the moisture in the separator tank can be condensed into the air stream and thus removed from the tank requiring periodic addition of water to the tank. When the sensor detects a low water level in the trap, the controller will automatically open control valve 65 in water supply line 66 whereupon water from supply reservoir 66 is delivered into the tank to bring the water in the trap back up to the desired operating level.

Water collected in the holding tank can be either disposed of in an environmentally safe manner or alternatively, redistributed over the grass playing field to nourish the turf, particularly during periods of less than normal rainfall. A liquid pump 69 is connected to the holding tank and provides liquid from the tank under pressure to a hose 70. The hose is equipped with a nozzle 71 for either distributing water over the playing field, or delivering the liquid to a suitable disposal unit (not shown).

Figure 3:
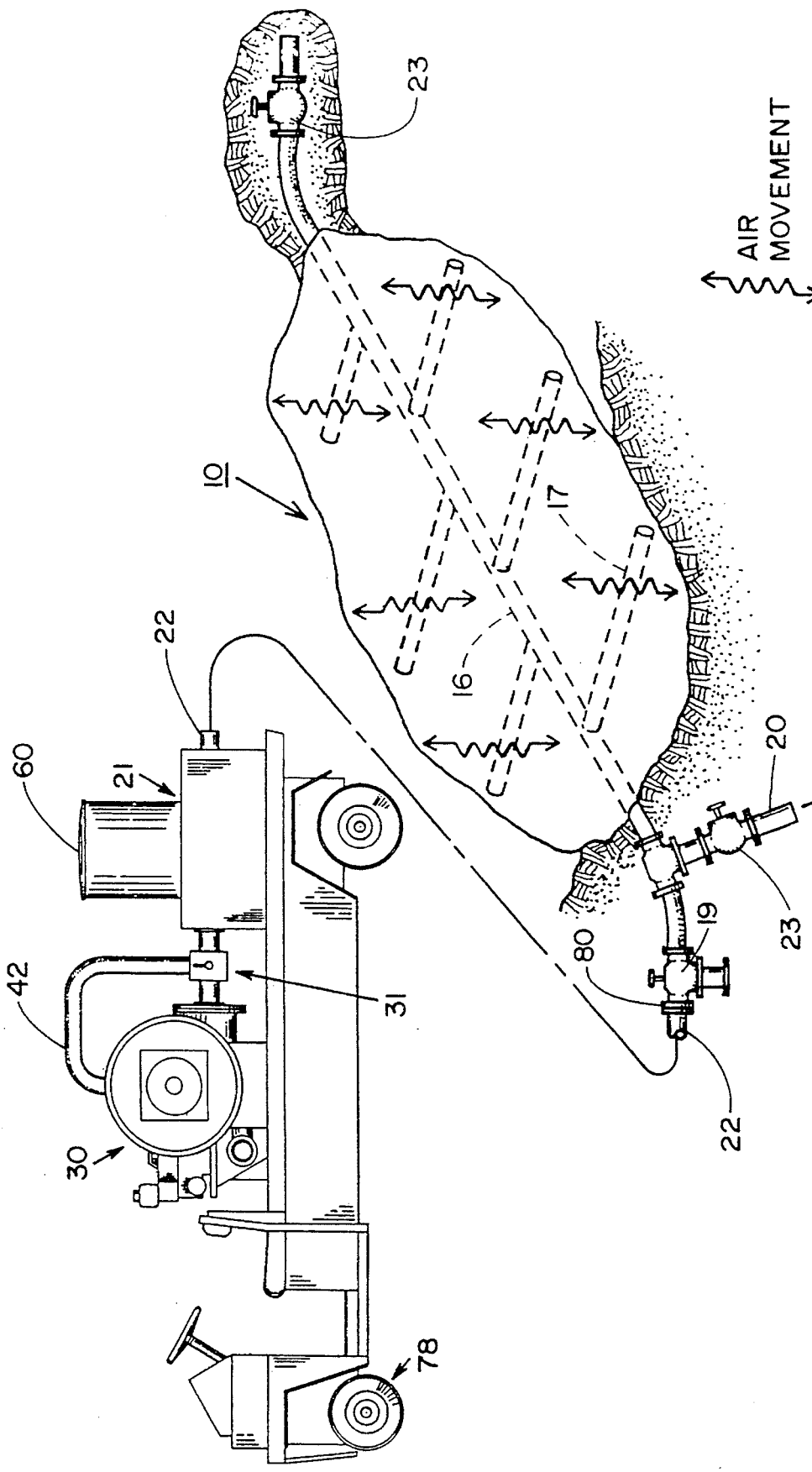
FIG. 3 illustrates another embodiment of the invention wherein the blower, a four-way reversing unit and the moisture separator are all mounted upon a self-propelled vehicle.

FIG. 3 illustrates a further embodiment of the invention wherein some of the system components are mounted on a mobile unit so that they can be easily transported from one playing field to another. In the case of a golf course that has a number of putting greens, each of which has its own duct network, the ability to transport much of the soil treatment equipment from one green to another as needed represents a considerable saving in equipment cost.

In this embodiment, the mobile transporter is a self-propelled vehicle 78 having a flat bed 77 upon which the mobile equipment includes blower 30, flow reversing unit 31, separator unit 21, holding tank 60 and a liquid pump (not shown). The mobile equipment components are all connected as described above and function as previously noted. The service line 22 in this case is a flexible line having a quick disconnect 80 at its distal end. The quick disconnect is arranged to be releasably connected to a coupling located on the separator side of control valve 19.

Normally, the control valve is cycled to permit the duct network to gravity feed directly into drain line 20 when the mobile unit is disconnected from the duct network. Valve 19 is recycled when the mobile equipment is coupled thereto, thus placing the mobile equipment in communication with the duct network whereupon air can be selectively moved in either direction through the soil profile of the playing field.

Although the present invention has been described with reference to use in association with a four way flow reversing valve, this valve can be replaced by a universal coupling that permits the separator to be selectively coupled to either the discharge or the suction port of the blower. This combined with the use of the above described mobile unit, provides for an economically feasible system for treating existing greens that are in compliance with USGA specifications. It is further envisioned that stationary systems embodying the apparatus of the present invention will be contained below ground in specially prepared vaults and that the control valves associated with the system will be automatically operated so that the system can be controlled from a remote location without having to enter the vault.

While this invention has been explained with reference to the structure disclosed herein, it is not confined to the details set forth and this application is intended to cover any modifications and changes as may come within the scope of the following claims:

What is claimed is:

1. Apparatus for treating the soil of a grass playing field that includes:
    a distribution means situated beneath the soil profile of a grass playing field for distributing air beneath the playing field,
    a piping system containing perforated lines that are laid in a pattern within the distribution means,
    a blower for pumping air, said blower having an air inlet port and an air outlet port,
    a supply line for selectively connecting the piping system to either said inlet port or said outlet port of the blower whereby air can be moved in either direction through the soil profile of the playing field, and
    a separator means for removing water from the air stream moving between the blower and the piping system.

2. The apparatus of claim 1 wherein said supply line includes a releasable coupling that is selectively connectable to the inlet and outlet ports of the blower.

3. The apparatus of claim 1 that further includes a four-way valve for selectively coupling the supply line to the blower.

4. The apparatus of claim 1 wherein said separator includes a tank for temporarily storing water removed from said air stream.

5. The apparatus of claim 4 wherein said separator further includes a filter means for separating water form said air stream.

6. The apparatus of claim 4 that further includes a drain means for removing water from said separator tank without effecting the blower operation.

7. The apparatus of claim 6 that further includes a holding tank connected to said drain means for collecting water separated from said air stream.

8. The apparatus of claim 7 that further includes a valve means in said drain means for selectively directing water passing through said drain means to said holding tank or to a drainage system.

9. The apparatus of claim 7 that further includes a liquid pump for removing the water collected in said holding tank.

10. The apparatus of claim 1 that further includes a mobile unit upon which the blower and the separator are mounted.

11. The apparatus of claim 10 that further includes a holding tank mounted on said mobile unit that is connected to said separator by a trap means.

12. The apparatus of claim 6 that further includes a trap means having a pair of vertically disposed lines connected by a 90° bend.

13. The apparatus of claim 12 wherein said trap means further includes a sensor means for detecting the water level in said trap means and a control means responsive to the sensor means for adding water to the trap means when the water in the trap means falls below a predetermined level.

14. Apparatus for treating the soil of a grass playing field,
    an air distribution system located beneath the soil profile of said playing field,
    a blower for moving air through the distribution system, said blower having an inlet port and an outlet port,
    connector means for selectively attaching either the air inlet port or the air outlet port of the blower to the distribution system whereby air can be pumped upwardly or drawn downwardly through the soil profile of the playing field,
    separator means connected between the blower and the air distribution system for removing water from the air stream moving between the blower and the distribution system.

15. The apparatus of claim 14 that further includes a drain means connected to the separator for removing water from the separator when the blower is in operation.

16. The apparatus of claim 15 wherein said drain means includes a U-shaped trap for maintaining a head pressure in the drain means that is greater than the pressure in the air stream passing through the separator whereby the operation of the blower is unaffected by the drain means in either a pumping or a suction mode of operation.

17. The apparatus of claim 16 further including a sensor means for detecting the water level in said trap and means for adding water to said trap to maintain the water in said trap at a desired level.

18. The apparatus of claim 17 that further includes a control means connected to said sensor means and a control valve in a water supply line connected to said trap that is opened by the control means detects a water level below the desired level.

19. The apparatus of claim 17 that further includes a holding tank connected to said drain means.

20. The apparatus of claim 19 that further includes a control valve means that is operable to direct water moving through said trap to the holding tank or to a drainage system.

21. The apparatus of claim 19 wherein said blower, said connector means, said separator means, and said holding tank are mounted upon a mobile unit.

* * * * *